(12) United States Patent
Bhatt et al.

(10) Patent No.: US 11,341,383 B2
(45) Date of Patent: May 24, 2022

(54) METHODS AND APPARATUS TO DETECT EFFECTIVE TILING AREA AND FILL TILES EFFICIENTLY

(71) Applicant: KYOCERA DOCUMENT SOLUTIONS INC., Osaka (JP)

(72) Inventors: Jayant Bhatt, Torrance, CA (US); Xuqiang Bai, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/931,871

(22) Filed: Jul. 17, 2020

(65) Prior Publication Data

US 2021/0049430 A1 Feb. 18, 2021

Related U.S. Application Data

(60) Provisional application No. 62/888,495, filed on Aug. 18, 2019.

(51) Int. Cl.
  *G06K 15/00* (2006.01)
  *G06K 15/02* (2006.01)
  *G06T 11/40* (2006.01)
(52) U.S. Cl.
  CPC .......... *G06K 15/1868* (2013.01); *G06T 11/40* (2013.01); *G06T 2210/12* (2013.01)
(58) Field of Classification Search
  None
  See application file for complete search history.

(56) References Cited

U.S. PATENT DOCUMENTS

| | | | |
|---|---|---|---|
| 5,065,344 A * | 11/1991 | Kishimoto | G06T 11/40 345/626 |
| 5,315,691 A | 5/1994 | Sumiya et al. | |
| 5,502,777 A * | 3/1996 | Ikemure | G06K 9/00449 382/173 |
| 6,009,195 A * | 12/1999 | Nakata | G06K 9/2018 358/452 |
| 6,437,876 B1 * | 8/2002 | Phang | G06K 15/00 358/1.2 |
| 8,169,625 B2 * | 5/2012 | Kerr | G06T 11/40 358/1.1 |
| 8,194,271 B2 | 6/2012 | Nakahara | |
| 8,520,243 B2 | 8/2013 | Nakahara | |
| 8,810,847 B2 | 8/2014 | Ito | |

(Continued)

FOREIGN PATENT DOCUMENTS

JP 2007026285 A 2/2007

*Primary Examiner* — Martin Mushambo
(74) *Attorney, Agent, or Firm* — GrowIP Law Group LLC

(57) ABSTRACT

The disclosure is directed towards methods and apparatus to detect effective tiling area and fill tiles efficiently. The method improves efficiency by not filling tiles within an inner box in a shape having a large unfilled area. One example method includes detecting an inner box, determining whether the detected inner box is big enough for pre-clipping, and confirming that the outer clip path contains the inner box. When filling tiles into a bounding rectangle tiling area, it is determined if a particular tile (or tile(s)) falls into an inner box or not, and if the tile falls in the inner box, that particular tile is not filled. According to one embodiment, the inner box is an internal rectangle that contains a maximum area in which it is unnecessary to fill tiles.

19 Claims, 14 Drawing Sheets

(56) References Cited

U.S. PATENT DOCUMENTS

| | | | |
|---|---|---|---|
| 8,861,003 B2* | 10/2014 | Shinohara | G06K 15/1813 358/1.15 |
| 9,727,808 B1* | 8/2017 | Nakahara | G06K 15/1802 |
| 9,767,392 B2 | 9/2017 | Bai et al. | |
| 2003/0147097 A1* | 8/2003 | Kotani | G06K 15/021 358/1.18 |
| 2004/0012796 A1* | 1/2004 | Matsuyama | H04N 1/3875 358/1.2 |
| 2004/0165209 A1* | 8/2004 | Aoki | G06K 15/00 358/1.14 |
| 2005/0002063 A1* | 1/2005 | Hanamoto | G06K 15/00 358/1.18 |
| 2005/0134583 A1* | 6/2005 | Kokojima | G06T 11/40 345/419 |
| 2005/0134887 A1* | 6/2005 | Miyata | G06F 3/1244 358/1.13 |
| 2005/0264554 A1* | 12/2005 | Deming | G06K 9/6267 345/418 |
| 2006/0001681 A1* | 1/2006 | Smith | G06T 11/60 345/629 |
| 2006/0028701 A1 | 2/2006 | Suzuki | |
| 2007/0234204 A1* | 10/2007 | Kobashi | G06F 40/103 715/210 |
| 2008/0037059 A1* | 2/2008 | Inoue | G06F 3/1285 358/1.15 |
| 2008/0198168 A1* | 8/2008 | Jiao | G06T 11/40 345/506 |
| 2009/0103139 A1* | 4/2009 | Ozawa | H04N 1/58 358/2.1 |
| 2010/0134509 A1* | 6/2010 | Matsuo | G06T 11/40 345/581 |
| 2010/0309489 A1 | 12/2010 | Bailey et al. | |
| 2011/0019239 A1* | 1/2011 | Kojima | G06F 3/0488 358/401 |
| 2011/0128586 A1* | 6/2011 | Tsunematsu | G06T 7/90 358/2.1 |
| 2011/0164258 A1* | 7/2011 | Nakamura | H04N 1/40068 358/1.2 |
| 2011/0286040 A1* | 11/2011 | Seto | G06F 3/125 358/1.15 |
| 2013/0188200 A1 | 7/2013 | Nakahara | |
| 2013/0222817 A1* | 8/2013 | Suzuki | G03G 15/6585 358/1.1 |
| 2013/0286422 A1* | 10/2013 | Hirano | G06K 15/1849 358/1.13 |
| 2014/0104453 A1* | 4/2014 | Fujinawa | H04N 5/23219 348/222.1 |
| 2014/0211226 A1* | 7/2014 | Ishii | G06K 15/4065 358/1.12 |
| 2015/0055154 A1* | 2/2015 | Hasegawa | H04N 1/04 358/1.9 |
| 2015/0055193 A1* | 2/2015 | Ozawa | H04N 1/00801 358/474 |
| 2015/0161814 A1* | 6/2015 | Engh-Halstvedt | G06T 1/60 345/420 |
| 2016/0275710 A1* | 9/2016 | Yoo | G06T 11/60 |
| 2016/0350949 A1* | 12/2016 | Bai | G06F 3/1208 |
| 2017/0030719 A1* | 2/2017 | Ishida | G09B 29/10 |

* cited by examiner

RECEIVING THE PDL STREAM DATA
101

PDL PRINT DATA STREAM PROCESSING
102

RENDERING OF THE PAGE IMAGE
103

IMAGE PROCESSING
104

COLOR CONVERSION
105

COMPRESSION
106

DECOMPRESSION
107

PAGE ROTATION TO MATCH ENGINE PAPER FEED
108

HALF-TONING
109

DELIVERY OF THE HALF-TONED IMAGE DATA TO THE ENGINE IN THE ORDER REQUIRED BY THE ENGINE
110

FIG. 1

(Conventional Method of Filling Tiles)

(Inner Clip Path with Polygon Lines)

(Bezier Curves and Polygon Lines)

(Outer clip path is rectangle)

METHODS AND APPARATUS TO DETECT EFFECTIVE TILING AREA AND FILL TILES EFFICIENTLY

RELATED APPLICATION

The present application claims priority to U.S. Provisional Patent Application No. 62/888,495, filed on Aug. 18, 2019, the entirety of which is incorporated by reference herein.

BACKGROUND

In the printing industry, Page Description Languages (PDLs), such as Postscript, PDF, and others, use tiles to fill certain areas to be printed. The input print job includes tile information and drawing area information. The drawing area information describes the area filled in by the tiles. A Raster Image Processor (RIP) system generally executes two steps pertaining to an order list: (1) generating the order list and (2) rendering by executing the order list to generate images for printing. The conventional method generates the order list to fill tiles into an entire bounding rectangle tiling area of drawing area first and then uses the drawing area information as a "clip path" to clip out tiles that are outside the drawing area. For some drawing area shapes, however, including those in which a big inner area does not need tiling, the conventional method is not efficient.

Therefore, it would be desirable to have an improved, more efficient method for printing drawing area shapes having a big inner area that does not need tiling.

BRIEF DESCRIPTION OF THE DRAWINGS

FIG. 1 is a simplified block diagram illustrating example stages of a printing process.

DETAILED DESCRIPTION

Figure 2:
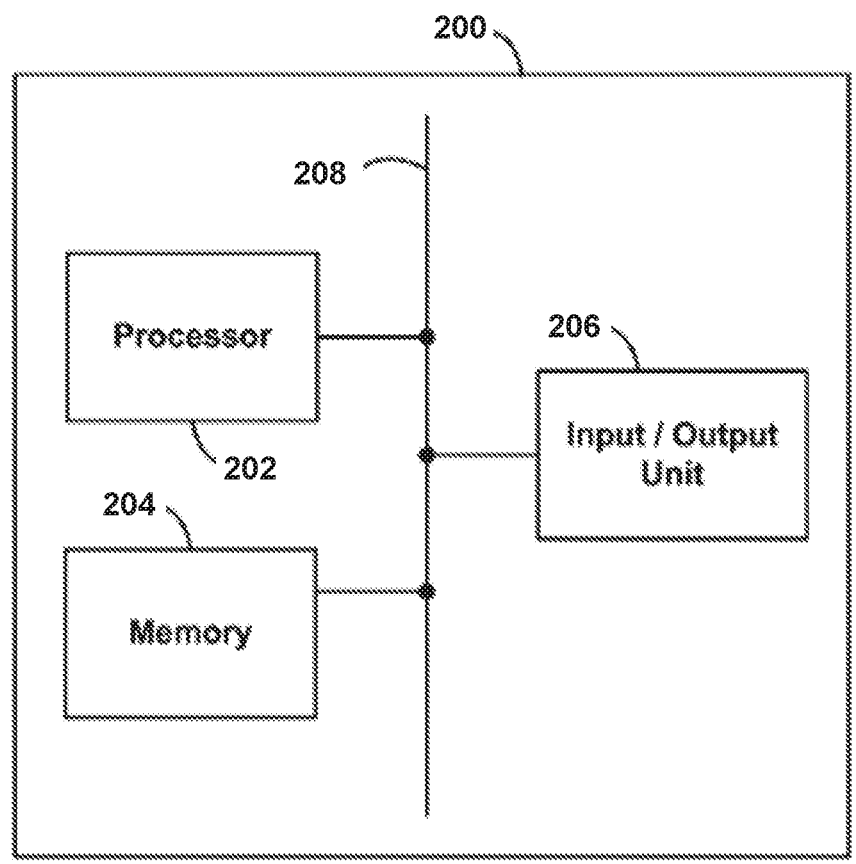
FIG. 2 is a simplified block diagram illustrating an example computing device that may be used to perform steps of the methods disclosed herein.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Overview

According to certain embodiments set forth herein, one or more methods include detecting a drawing shape having an inner, untiled box. Upon detecting such an inner box, the method involves excluding tile fillings inside the detected inner box (i.e., a tiling order list is not generated for tiles located inside the inner box.). By operating on the tiling area (a specified area on a page where tiles are drawn) in this way, tiling performance, including efficiency with respect to at least tiling time and memory usage, is improved.

II. PDL Printing Process and Example Computing Device Components

The printing process may include many printer processing stages that use a central processing unit (CPU), application specific integrated circuit (ASIC), or a digital signal processor (DSP) component controlled by the CPU for a printing device. These printer processing stages, as shown in FIG. 1, include receiving the PDL stream data 101, PDL print data stream processing 102, rendering the page of the image 103, image processing 104, color conversion 105, compression 106, decompression 107, page rotation to match engine paper feed 108, half-toning 109, and delivery of the half-toned image to the engine in the order required by the engine 110. Depending on the hardware and architecture of the printing device, the stages and the order of the stages of FIG. 1 may vary.

A printing device first receives the PDL stream data during printer processing stage 101. After receiving the PDL data, the printing device processes the received PDL print data stream during printer processing stage 102. A PDL is a language that describes the appearance of the printed page. Many PDLs can specify how a page should be marked or drawn, including PCLXL, PostScript, PCL5, PDF, XPS, SVG, etc.

A PDL print data stream is a serial sequence of commands that can establish a marking state, modify a marking state, or specify an object to be drawn at a location on one or more pages. The marking state is the net result of all prior commands that may be required for drawing (i.e., cumulative). A drawing command can mark pixels already marked by a prior drawing command. The result of the drawing command for each pixel may depend on the result of previous drawing commands for the same pixel. The drawing commands may be ordered in sequence. The drawing commands may be unordered with respect to the page location.

A PDL may include one or more operations that contribute to the marking state specified by the PDL. Examples of operations may include "text," "fill" (e.g. using tiles, as described herein), "stroke," "image," and other operations. The operations may include one or more functions to execute the operation. During PDL print data stream processing stage 102, the PDL may generate one or more requests that may be associated with a particular operation and/or a particular function.

FIG. 2 depicts an example embodiment 200 of computing device components (e.g., functional elements of a computing device) that may be included in a printing device. The printing device may be a multi-function printing device capable of printing, scanning, copying, faxing, and/or other device functions. The device could be a different computing device capable of other functions.

Computing device components 200 may include a processor 202, memory 204, and input/output unit 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Memory 204, in turn, may comprise volatile and/or non-volatile data storage and can be integrated in whole or in part with processor 202. Memory 204 may store program instructions, executable by processor 202, and data that are manipulated by these instructions to carry out the various methods, processes, or functions described herein. Alternatively, these methods, processes, or operations can be defined by hardware, firmware, and/or any combination of hardware, firmware and software. Therefore, memory 204 may include a tangible, nontransitory computer-readable medium, having stored thereon program instructions that, upon execution by one or more processors, cause the printing device to carry out any of the methods, processes, or functions disclosed in this specification or the accompanying drawings.

Input/output unit 206 may serve to configure and/or control the operation of processor 202 for one or more of the printer processing stages described in FIG. 1. Input/output unit 206 may also provide output based on the operations performed by processor 202.

These examples of computing device components (e.g. printing device components) are provided for illustrative purposes. In addition to and/or alternatively to the examples above, other combinations and/or sub combinations of computing device components may also exist, amongst other possibilities, without departing from the scope of the embodiments herein.

Figure 3:
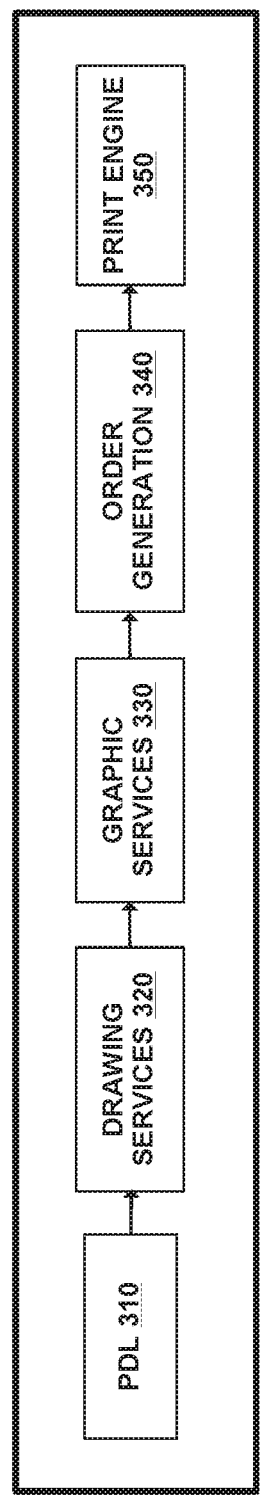
FIG. 3 is a simplified block diagram illustrating data flow for a typical PDL.

FIG. 3 is a block diagram illustrating data flow for a typical PDL. FIG. 3 displays an existing synchronous data flow that may be implemented on a single-core processor. Implementation on a multi-core processor may differ somewhat from what is shown in FIG. 3. In FIG. 3, a PDL 310 may be parsed during a parsing stage (e.g. part of stage 102 in FIG. 1) to generate synchronous requests for subsequent PDL processing stages. PDL processing then continues to a drawing services stage 320, followed by graphic services stage 330, followed by order generation 340, and finally print engine 350.

III. Conventional Method for Filling Tiles

Figure 4:
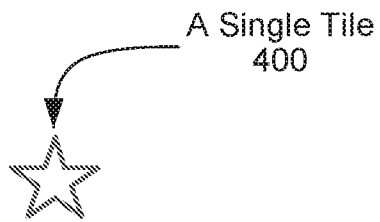
FIG. 4 is a simplified conceptual diagram illustrating a single tile.
Figure 5:
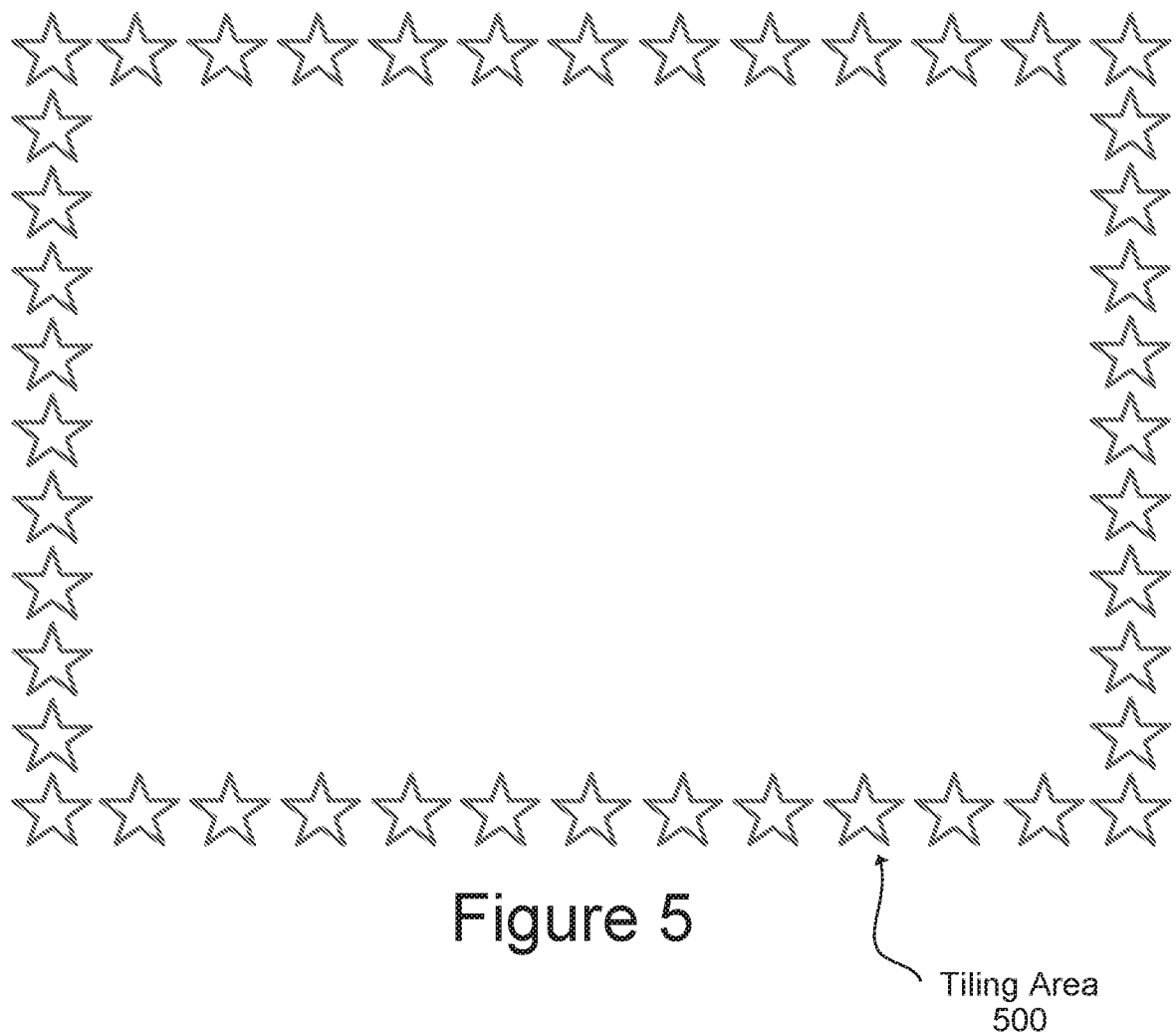
FIG. 5 is a simplified conceptual diagram illustrating a tiling area.
Figure 6:
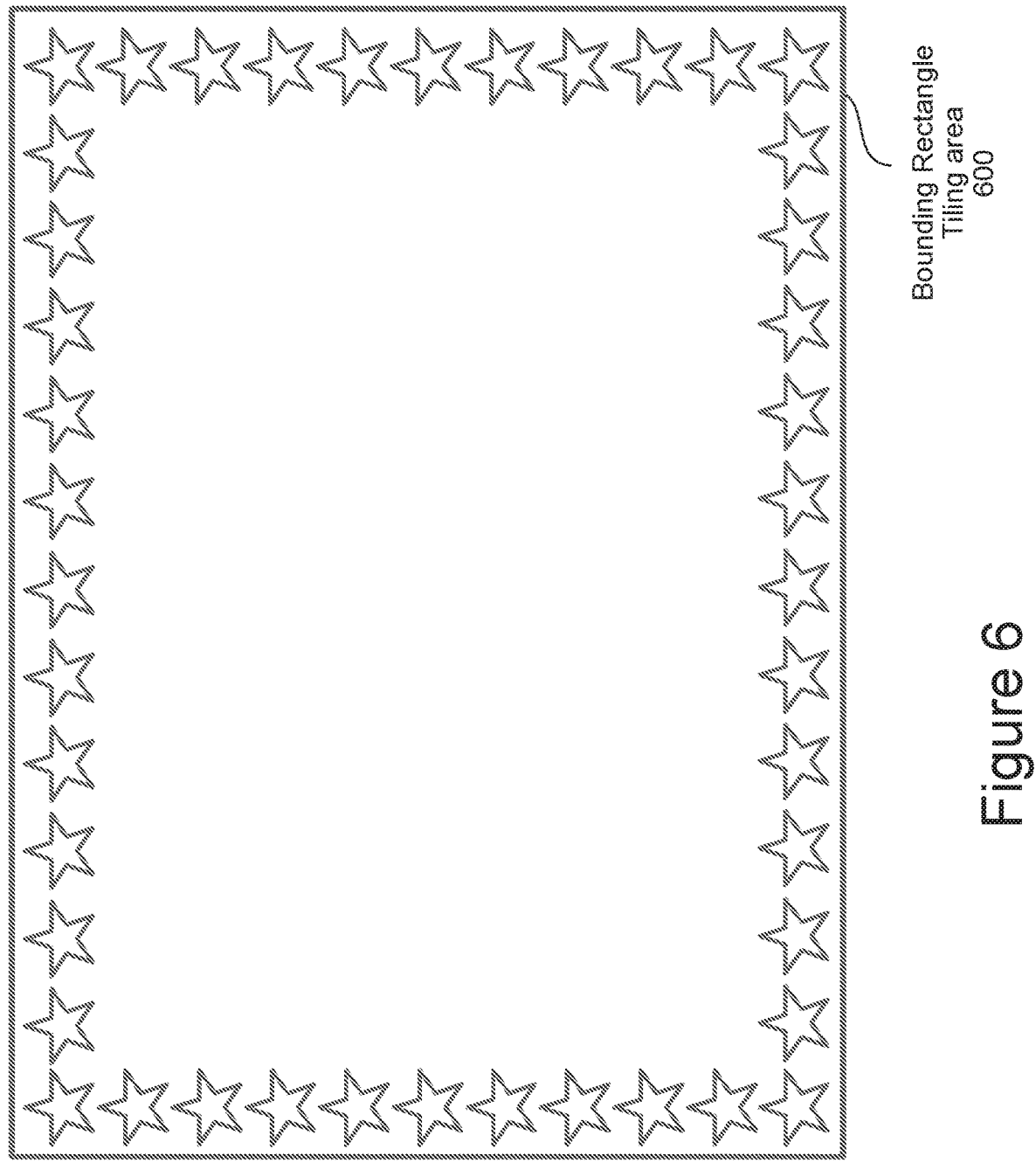
FIG. 6 is a simplified conceptual diagram illustrating a bounding rectangle tiling area.

FIG. 4 is a simplified conceptual diagram illustrating a representation of a single tile 400. To fill a tiling area 500 shown in FIG. 5 using the tile 400, a conventional method for filling a drawing area shape in which a big inner area does not need tiling involves first obtaining the bounding rectangle tiling area. FIG. 6 is a simplified conceptual diagram illustrating such a bounding rectangle tiling area 600. As can be seen, the tiling area 500 from FIG. 5 is fully enclosed within the bounding rectangle tiling area 600.

Figure 7:
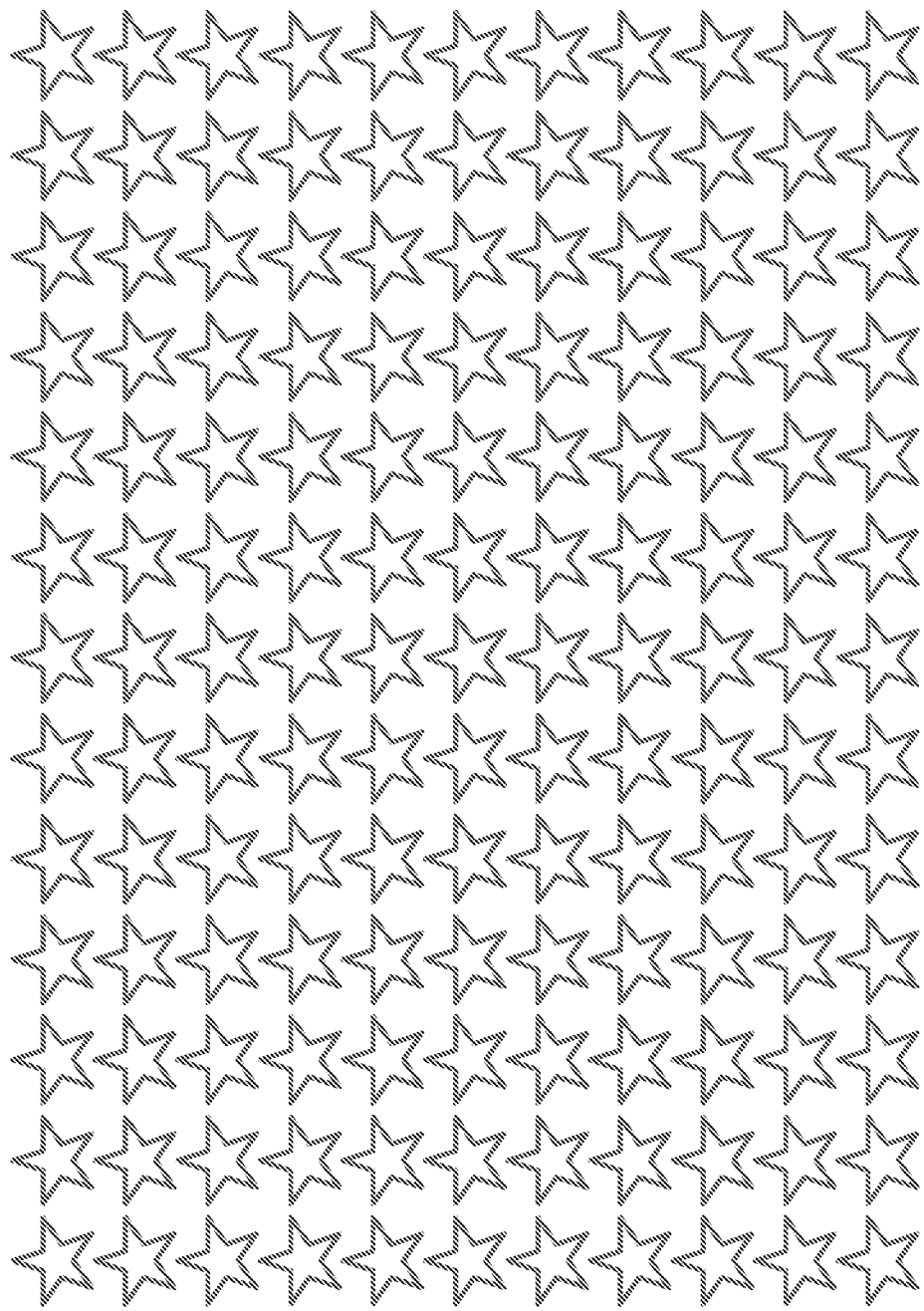
FIG. 7 is a simplified conceptual diagram illustrating a conventional method of filing tiles.

The aforementioned conventional method then involves filling the entire bounding rectangle tiling area 600 with tiles, as shown in FIG. 7. Then, in the rendering process, the conventional method uses a drawing area as a clip path to clip out the interior tiles that are out of drawing area (i.e., inside the single-row box of tiles) to get the result shown at FIG. 5.

IV. Efficient Method for Detecting Effective Tiling Area and Filling Tiles

Figure 8:
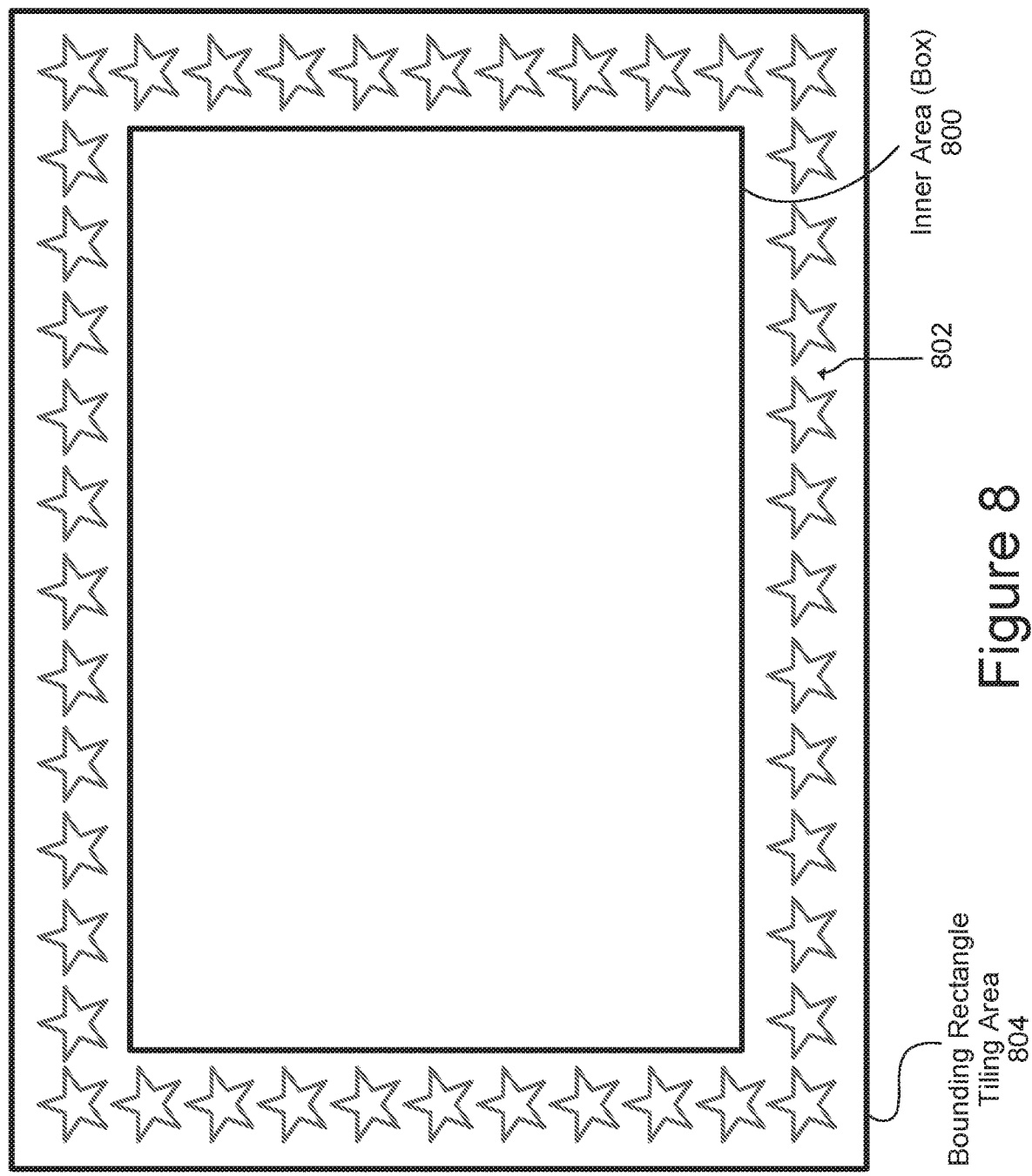
FIG. 8 is a simplified conceptual diagram illustrating an inner box and a bounding rectangle tiling area.

Embodiments described herein improve on the above-described conventional method by detecting an inner area that does not need to be tiled. FIG. 8 is a simplified conceptual diagram illustrating such an inner area 800 (in this case, a box) that does not need to be tiled. The inner area 800 is inside the tiled drawing area 802, which is bounded by the bounding rectangle tiling area 804.

Figure 9:
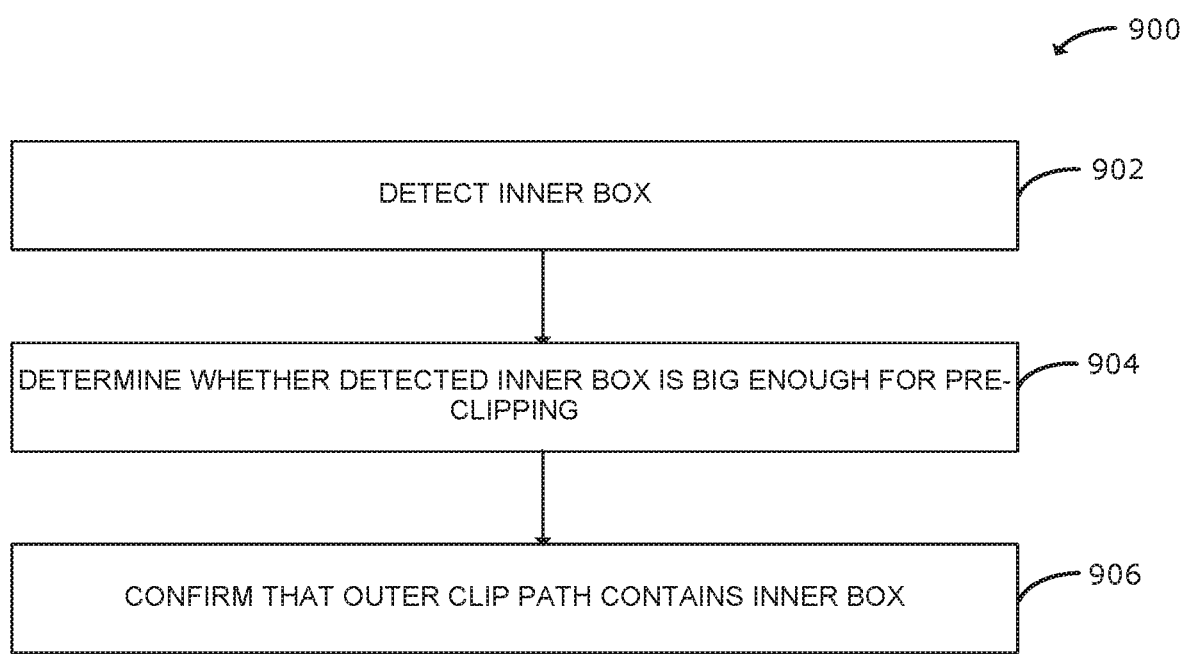
FIG. 9 is a high-level flow diagram illustrating a method to detect effective tiling area and fill tiles.

At a high level, the basic method 900 for detecting an effective tiling area and filling tiles is shown in the flow diagram of FIG. 9. The method 900 includes, at block 902, detecting an inner box. At block 904, the method includes determining whether the detected inner box is big enough for pre-clipping. At block 906, the method includes confirming that the outer clip path contains the inner box. So, when filling tiles into a bounding rectangle tiling area, the method generally involves determining if a particular tile (or tile(s)) falls into an inner box or not, and if the tile falls in the inner box, that particular tile is not filled. According to one embodiment, the inner box is an internal rectangle that contains a maximum area in which it is unnecessary to fill tiles.

Figure 10:
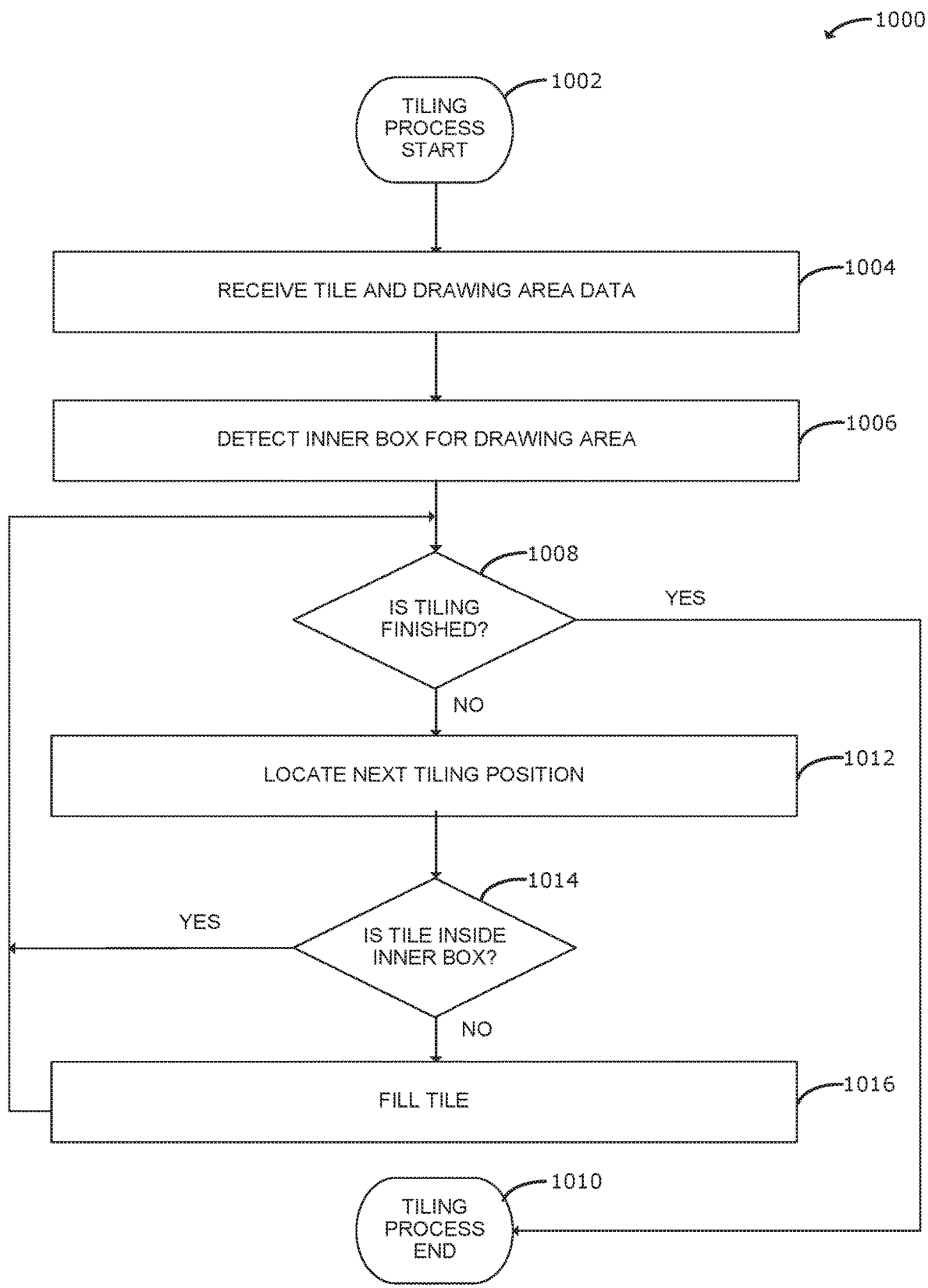
FIG. 10 is a high-level flow diagram illustrating a method for filling tiles.

FIG. 10 is a high-level flow diagram illustrating a method 1000 for tiling, according to one embodiment. The method 1000 includes the start of the tiling process at block 1002. At block 1004, the method 1000 includes receiving tile and drawing area data. At block 1006, the method 1000 includes detecting an inner box for a drawing area. At block 1008, the method 1000 includes determining whether tiling is finished. If tiling is finished, then the method 1000 concludes at the tiling process end, as shown in block 1010. If tiling is not finished, then the method 1000 continues to block 1012, where the next tiling position is located. At block 1014, the method 1000 includes determining whether a particular tile is inside the inner box that was detected in block 1006. If the particular tile is inside the inner box, then the method 1000 includes making the determination set forth in block 1008. If the particular tile is not inside the inner box, then the method 1000 includes filling the tile, as shown in block 1016. The method then continues with making the determination set forth in block 1008.

The methods 900 and 1000 can be carried out by one or more processors executing instructions stored on a computer readable medium. For example, the processor 202, memory 204, input/output unit 206, and bus 208 of FIG. 2 can be used to implement the methods 900 and 1000. Such components could be part of a printing device, for example, and/or some other computing device in communication with a printing device.

a. Detecting the Inner Box

The first part of the method, detecting an inner box, will now be described for three separate cases: (1) the inner clip path is a rectangle, (2) the inner clip path consists of polygon lines (e.g. a rectangle having clipped corners (see the clip path 1100 in FIG. 11)), and (3) the inner clip path is a cubic Bezier curve combined with polygon lines.

Case 1: Inner Clip Path is Rectangle

In the first case, where the inner clip path is a rectangle, then the inner box is simply the rectangle.

Case 2: Inner Clip Path with Polygon Lines

In the second case, where the inner clip path consists of polygon lines (see the clip path 1100 in FIG. 11), detecting an inner box includes first calculating the center point for those polygon lines:

$$X\text{center}=(X0+X1+ \ldots +Xn-1)/n, \text{ and}$$

$$Y\text{center}=(Y0+Y1+ \ldots +Yn-1)/n,$$

where n is the point number of polygon lines.

Then, each of the polygon points is compared with the calculated center point:
A. Polygon point is in left top of center point:

$$\text{Inner box } X\_\text{leftop}=\text{maximum}(Xn)$$

$$\text{Inner box } Y\_\text{lefttop}=\text{maximum}(Yn)$$

Where Xn and Yn are polygon X and Y coordinates located at left top of center point.
B. Polygon point is in right top of center point:

$$\text{Inner box } X\_\text{righttop}=\text{minimum}(Xn)$$

$$\text{Inner box } Y\_\text{righttop}=\text{maximum}(Yn)$$

Where Xn and Yn are polygon X and Y coordinates located at right top of center point.
C. Polygon point is in left bottom of center point:

$$\text{Inner box } X\_\text{leftbottom}=\text{maximum}(Xn)$$

$$\text{Inner box } Y\_\text{leftbottom}=\text{minimum}(Yn)$$

Where Xn and Yn are polygon X and Y coordinates located at left bottom of center point.
D. Polygon point is in right bottom of center point:

$$\text{Inner box } X\_\text{rightbottom}=\text{minimum}(Xn)$$

$$\text{Inner box } Y\_\text{rightbottom}=\text{minimum}(Yn)$$

Where Xn and Yn are polygon X and Y coordinates located at left bottom of center point.
Next, the inner box left top and right bottom coordinates are calculated:

$$\text{Inner box } X\_\text{lefttop}=\text{maximum}(\text{inner box } X\_\text{lefttop}, \text{inner box } X\_\text{leftbottom})$$

$$\text{Inner box } Y\_\text{lefttop}=\text{maximum}(\text{inner box } Y\_\text{lefttop}, \text{inner box } Y\_\text{righttop})$$

$$\text{Inner box } X\_\text{rightbottom}=\text{minimum}(\text{inner box } X\_\text{righttop}, \text{inner box } X\_\text{rightbottom})$$

$$\text{Inner box } Y\_\text{rightbottom}=\text{minimum}(\text{inner box } Y\_\text{leftbottom}, \text{inner box } Y\_\text{rightbottom})$$

Figure 11:
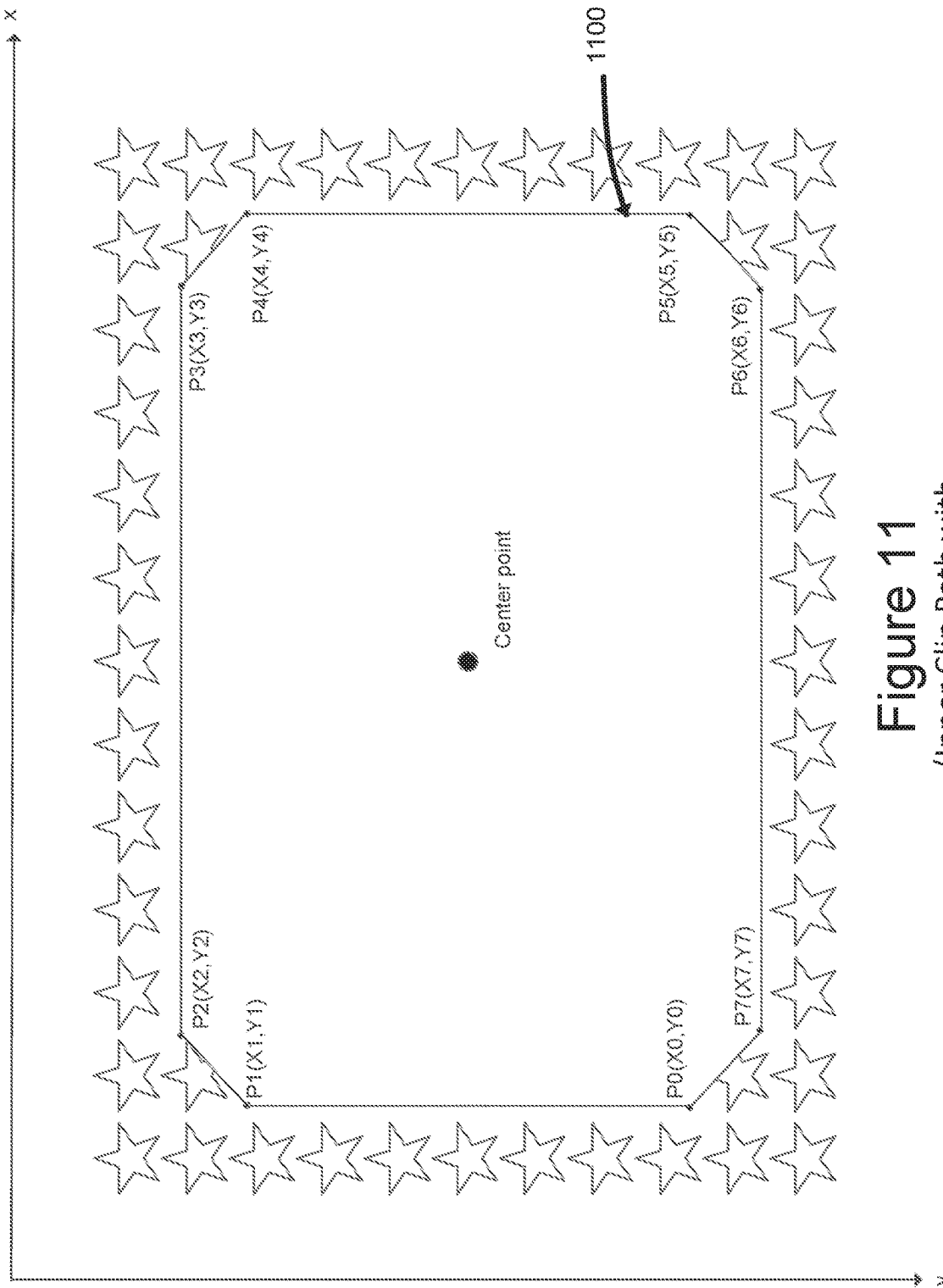
FIG. 11 is a simplified conceptual diagram illustrating an inner clip path with polygon lines.
Figure 12:
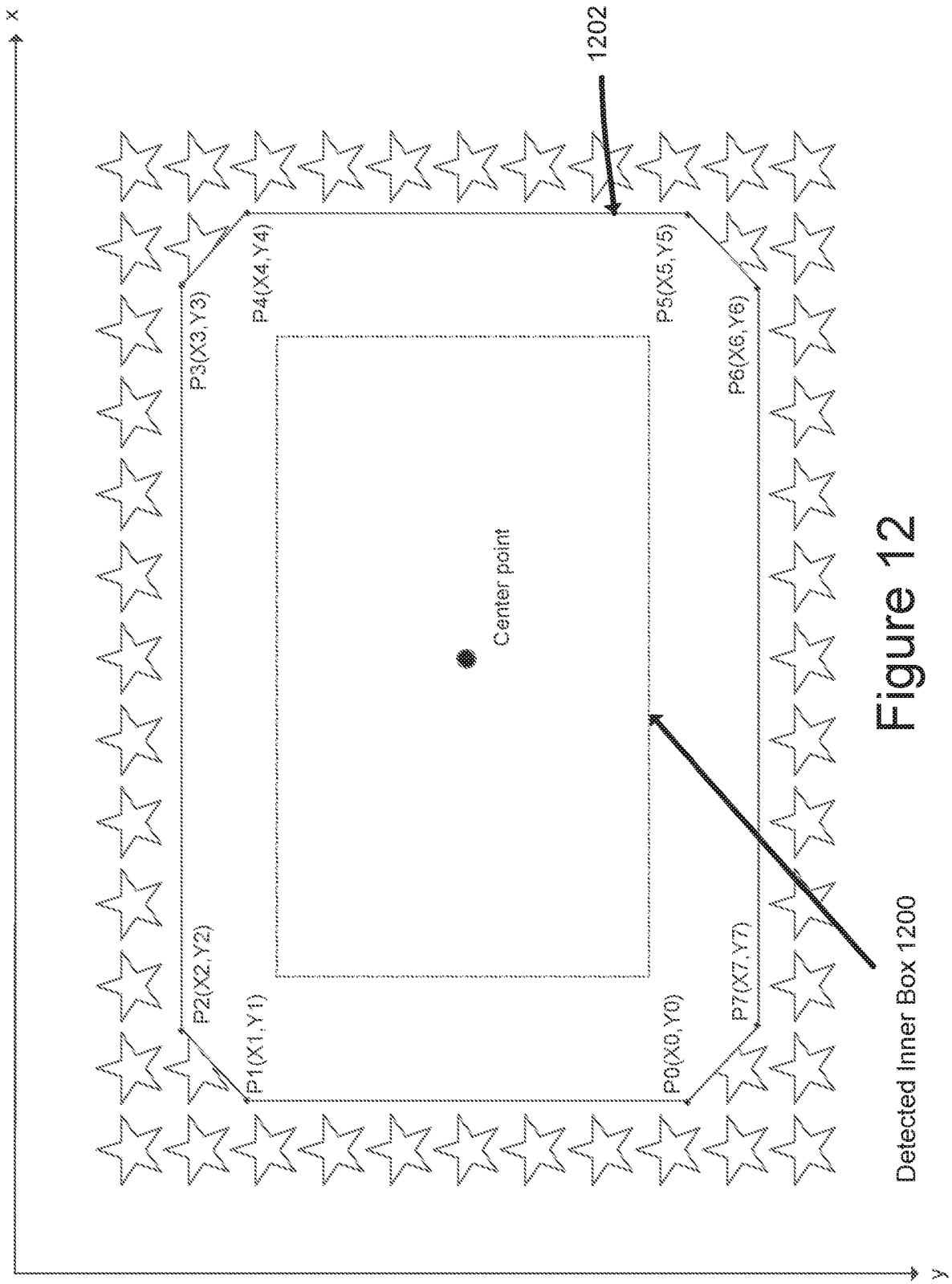
FIG. 12 is a simplified conceptual diagram illustrating a detected inner box associated with the inner clip path of FIG. 11.

FIG. 12 is a simplified conceptual diagram illustrating the detected inner box 1200 where the inner clip path 1202 consists of polygon lines (see also FIG. 11).

Case 3: Inner Clip Path is Cubic Bezier Curve Combined with Polygon Lines

Figure 13:
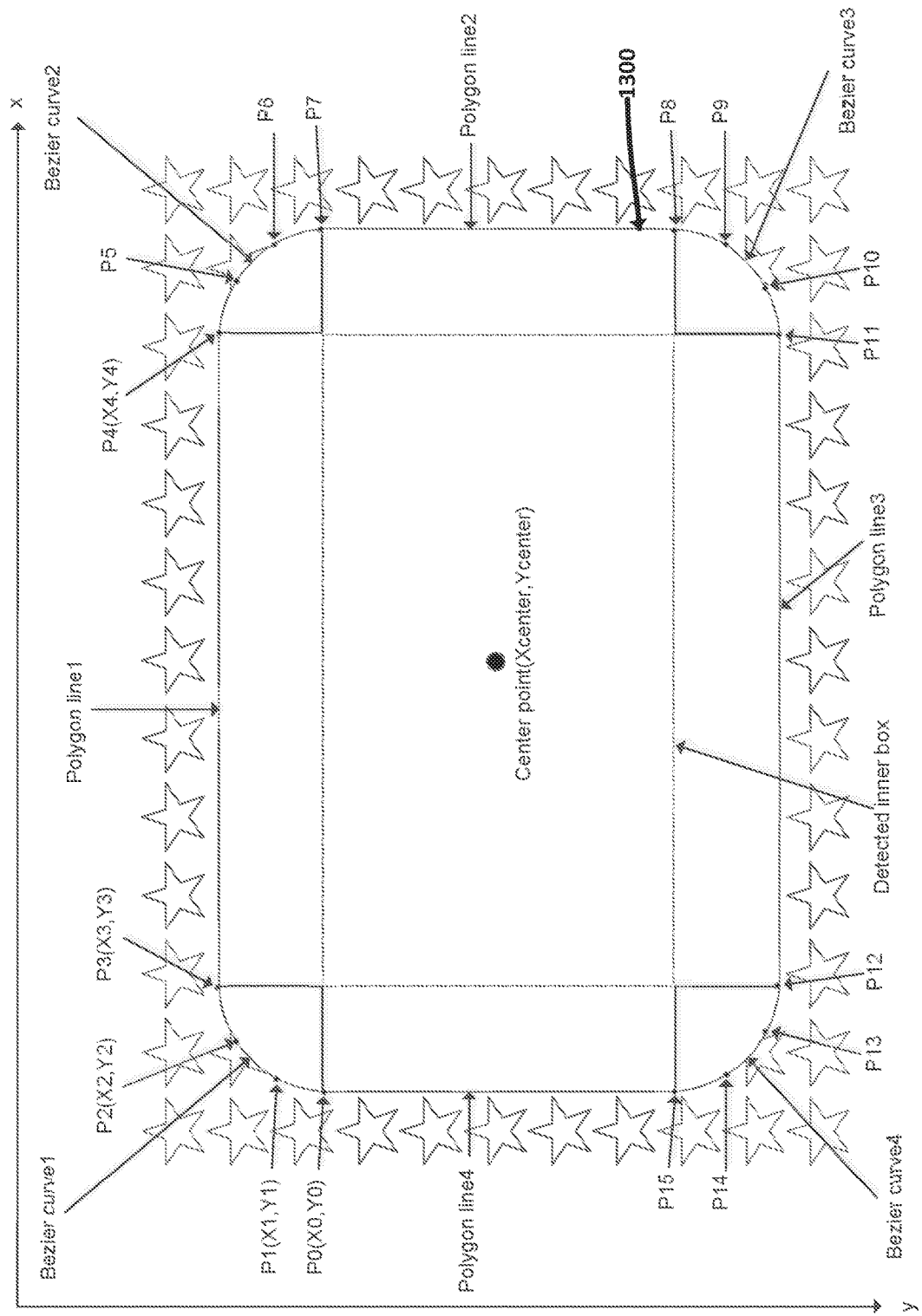
FIG. 13 is a simplified conceptual diagram illustrating an inner clip path with Bezier curves and polygon lines.

As shown at FIG. 13, inner clip path 1300 is composed of four Bezier cubic curves and four polygon lines. P0 is Bezier curve1 start point, P3 is Bezier curve1 end point, P1, P2 are two control points for Bezier curve1. P3 is polygon line1 start point and P4 is polygon line end point.

For this third case, detecting an inner box includes first calculating the center point using all the start points, end points, and control points:

$$X\text{center}=(X0+X1+ \ldots +Xn-1)/n, \text{ and}$$

$$Y\text{center}=(Y0+Y1+ \ldots +Yn-1)/n.$$

Then, it is determined if Bezier cubic curves are contained inside a region relative to the calculated center point that is (a) left top, (b) right top, (c) left bottom, or (d) right bottom. Determining whether a Bezier cubic curve is contained inside one of these regions, includes checking the relationship between the center point and Bezier curve points. Ps(Xs,Ys) is the Bezier cursive start point, Pe(Xe,Ye) is the Bezier cursive end point, and Pc1(Xc1,Yc1) and Pc2(Xc2, Yc2) are two control points. The following conditions are used to determine if the Bezier curve is inside one of those regions.

The Bezier curve is located in left top of center point if the following conditions are true:

$$(Xs<X\text{center}) \text{ AND } (Ys<Y\text{center}) \text{ AND}$$

$$(Xe<X\text{center}) \text{ AND } (Ye<Y\text{center}) \text{ AND}$$

$$(Xc1<X\text{center}) \text{ AND } (Yc1<Y\text{center}) \text{ AND}$$

$$(Xc2<X\text{center}) \text{ AND } (Yc2<Y\text{center})$$

The Bezier curve is located in right top of center point if the following conditions are true:

$$(Xs>X\text{center}) \text{ AND } (Ys<Y\text{center}) \text{ AND}$$

$$(Xe>X\text{center}) \text{ AND } (Ye<Y\text{center}) \text{ AND}$$

$$(Xc1>X\text{center}) \text{ AND } (Yc1<Y\text{center}) \text{ AND}$$

$$(Xc2>X\text{center}) \text{ AND } (Yc2<Y\text{center})$$

The Bezier curve is located in left bottom of center point if the following conditions are true:

$$(Xs<X\text{center}) \text{ AND } (Ys>Y\text{center}) \text{ AND}$$

$$(Xe<X\text{center}) \text{ AND } (Ye>Y\text{center}) \text{ AND}$$

$$(Xc1<X\text{center}) \text{ AND } (Yc1>Y\text{center}) \text{ AND}$$

$$(Xc2<X\text{center}) \text{ AND } (Yc2>Y\text{center})$$

The Bezier curve is located in right bottom of center point if the following conditions are true:

($Xs > X$center) AND ($Ys > Y$center)

($Xe > X$center) AND ($Ye > Y$center)

($Xc1 > X$center) AND ($Yc1 > Y$center)

($Xc2 > X$center) AND ($Yc2 > Y$center)

Next, Bezier curve bounding boxes are calculated and inner box candidate points are determined:
if the Bezier curve is located in left top of center point, take right bottom point of its bounding box as inner box candidate point,
if the Bezier curve is located in right top of center point, take left bottom point of its bounding box as inner box candidate point,
if the Bezier curve is located in left bottom of center point, take right top point of its bounding box as inner box candidate point, or
if the Bezier curve is located in right bottom of center point, take left top point of its bounding box as inner box candidate point.

Then, the inner box left top and right bottom points are calculated, using the following:

Inner box $X$_lefttop=maximum($X$ coordinates of inner box candidate points and polygon line points, which points are inside left top region of center point)

Inner box $Y$_lefttop=maximum($Y$ coordinates of inner box candidate points and polygon line points, which points are inside left top region of center point)

Inner box $X$_righttop=minimum($X$ coordinates of inner box candidate points and polygon line points, which points are inside right top region of center point)

Inner box $Y$_righttop=maximum($Y$ coordinates of inner box candidate points and polygon line points, which points are inside right top region of center point)

Inner box $X$_leftbottom=maximum($X$ coordinates of inner box candidate points and polygon line points, which points are inside left bottom region of center point)

Inner box $Y$_leftbottom=minimum($Y$ coordinates of inner box candidate points and polygon line points, which points are inside left bottom region of center point)

Inner box $X$_rightbottom=minimum($X$ coordinates of inner box candidate points and polygon line points, which points are inside right bottom region of center point)

Inner box $Y$_rightbottom=minimum($Y$ coordinates of inner box candidate points and polygon line points, which points are inside right bottom region of center point)

Inner box $X$_lefttop=maximum($X$_lefttop,$X$_leftbottom)

Inner box $Y$_lefttop=maximum($Y$_lefttop,$Y$_righttop)

Inner box $X$_rightbottom=minimum($X$_righttop, $X$_rightbottom)

Inner box $Y$_rightbottom=minimum($Y$_leftbottom, $Y$_rightbottom)

The above description, for three separate cases, relates to detecting an inner box. After detecting the inner box, a determination is made as to whether the detected inner box is big enough for pre-clipping.

b. Determining Whether the Detected Inner Box is Big Enough for Pre-Clipping

To determine whether the detected inner box is big enough for pre-clipping, the method includes comparing the inner box width or height (or another dimension) to a pre-defined threshold. If the inner box width is smaller than a first pre-defined threshold or if the inner box height is smaller than a second pre-defined threshold, then the method makes the determination that the inner box is too small for pre-clipping. In other words, any efficiencies or other benefits are likely to be marginal or outweighed by additional required processing, for example. In such a case, the method includes ignoring the detected inner box and instead using conventional methods for the particular tiling at issue.

c. Confirm that the Outer Clip Path Contains the Inner Box

The next part of the method, confirming that the outer clip path contains the inner box, will now be described for (1) the case where the outer clip path is a rectangle, and (2) the case where the outer clip path consists of polygon lines.

Case 1: The Outer Clip Path is a Rectangle

Figure 14:
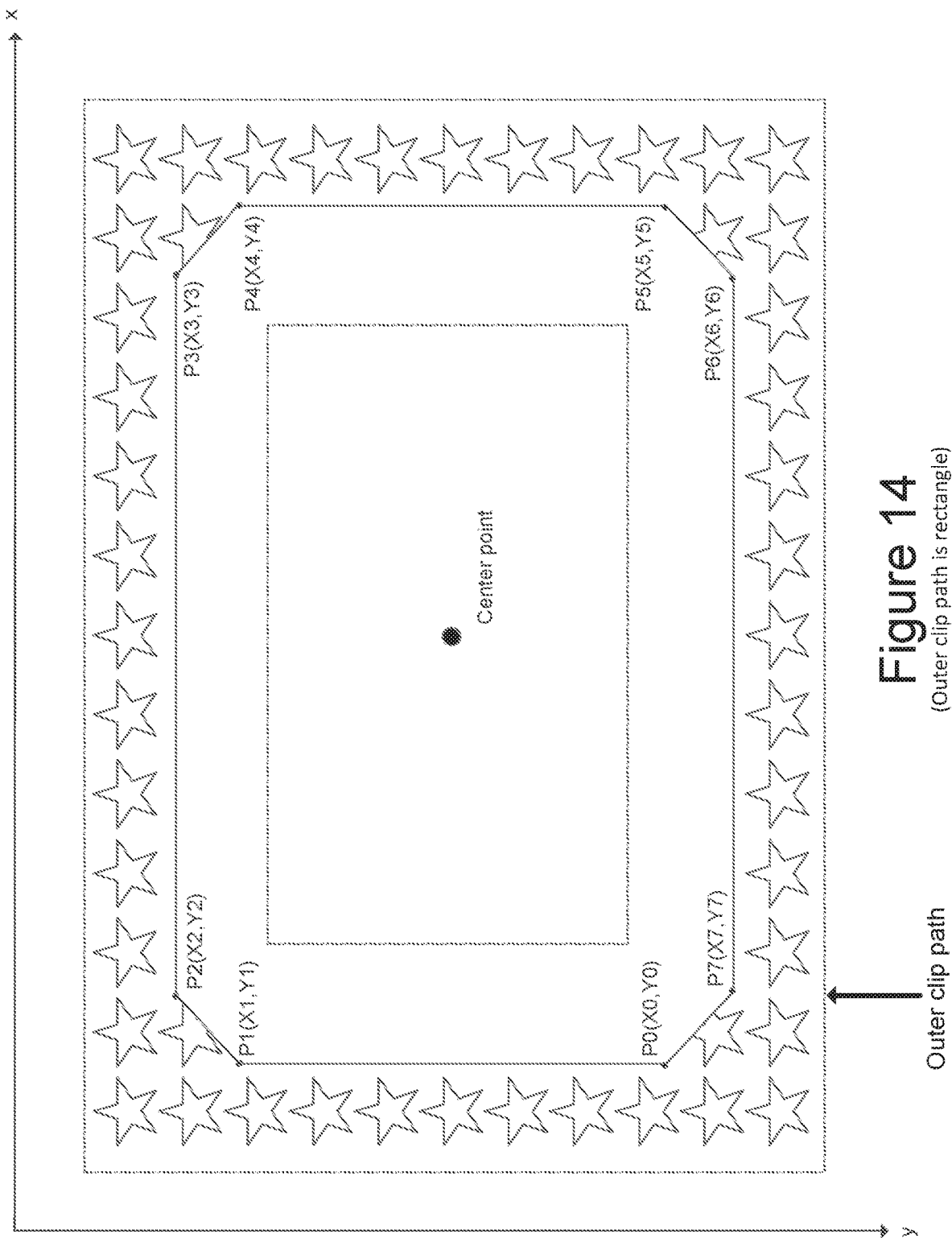
FIG. 14 is a simplified conceptual diagram illustrating a rectangular outer clip path.

In the case where the outer clip path is a rectangle, as illustrated in FIG. 14, then the outer rectangle left top point is defined as (X_outer_lefttop, Y_outer_lefttop).

The outer rectangle right bottom point is defined as (X_outer_rightbottom, Y_outer_rightbottom).

If the following conditions are met, then the outer clip path contains the inner box (see the rectangle outer box 1400 shown in FIG. 14.):

($X$_outer_lefttop<inner box $X$_lefttop) AND ($Y$_outer_lefttop<inner box $Y$_lefttop) AND ($X$_outer_rightbottom>inner box $X$_rightbottom) AND ($Y$_outer_rightbottom>inner box $Y$_rightbottom)

Case 2: The Outer Clip Path is Polygon Lines

In the case where the outer clip path consists of polygon lines, then (Xs,Ys) is defined as the polygon line start point and (Xe, Ye) is the polygon line end point. If any outer polygon line meets the following conditions, then the outer clip path contains the inner box:

(($Ys$<inner box $Y$_lefttop) AND ($Ye$<inner box $Y$_lefttop)) OR (($Xs$<inner box $X$_lefttop) AND ($Xe$<inner box $X$_lefttop)) OR (($Xs$>inner box $X$_rightbottom) AND ($Xe$>inner box $X$_rightbottom)) OR ((Ys>inner box Y_rightbottom) AND (Ye>inner box Y_rightbottom))

V. Determining Whether Tiles are Inside the Inner Box or Not

Figure 15:
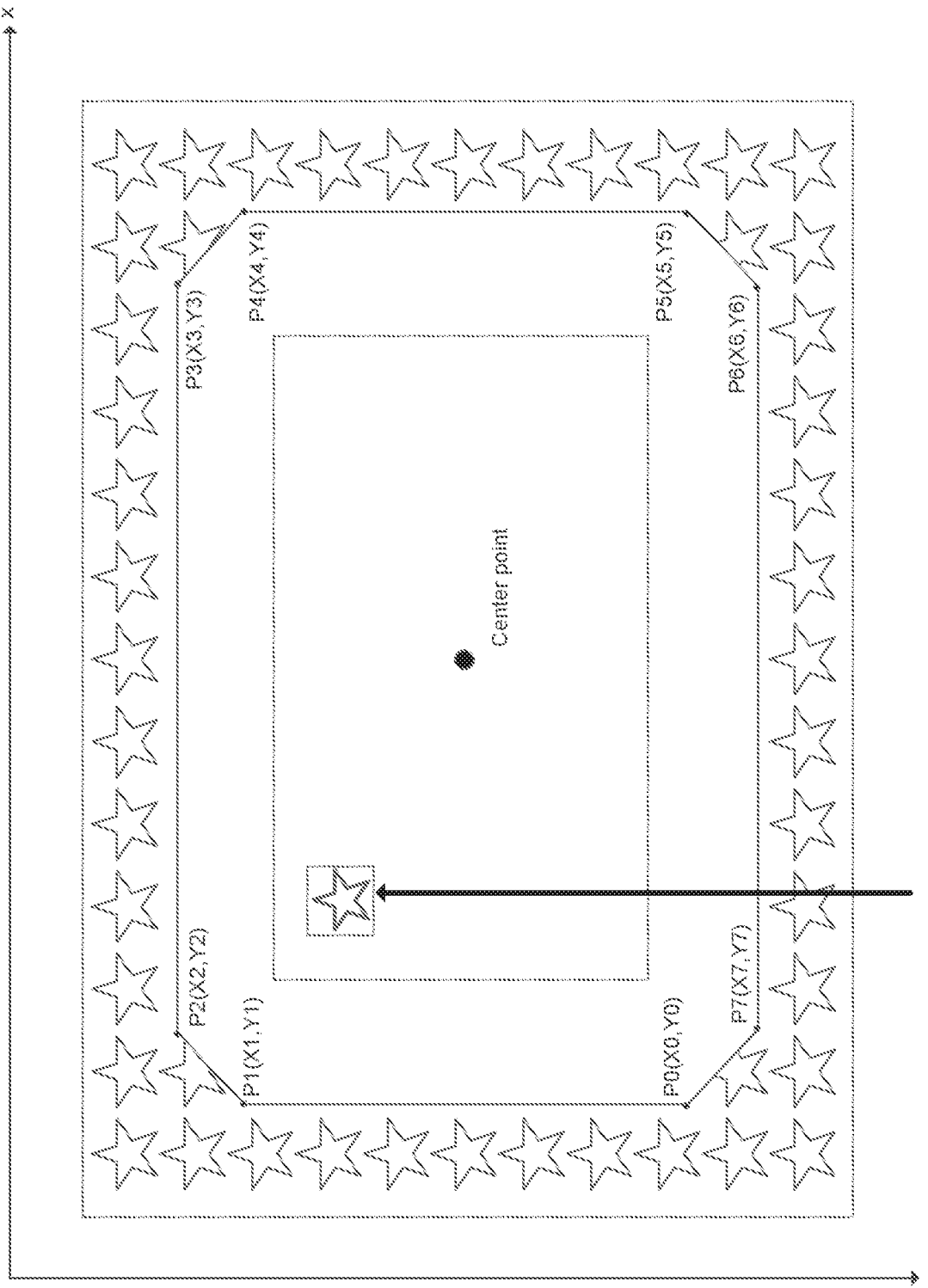
FIG. 15 is a simplified conceptual diagram illustrating a tile bounding box inside an inner box.

FIG. 15 is a simplified conceptual diagram illustrating how to determine whether a tile is inside the detected inner box or not. Determining whether any tiles are inside the inner box or not involves first determining the tile bonding box 1500 of a particular tile in the tiling area. Then, the tile's determined bounding box is compared with the with inner box to determine if the tile is inside the inner box or not.

The left top point of tile bounding box 1500 is defined as (X_tile_lefttop, Y_tile_lefttop) and the right bottom of tile bounding box 1500 is defined as (X_tile_rightbottom, Y_tile_rightbottom). The pertinent tile (bounded by the tile bounding box 1500) is inside inner box if the following conditions are met.

(X_tile_lefttop>inner box X_lefttop) AND (Y_tile_lefttop>inner box Y_lefttop) AND (X_tile_rightbottom<inner box X_innerbox_rightbottom) AND (Y_tile_rightbottom<inner box Y_rightbottom)

VI. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   detecting an inner box in a drawing shape to be filled, wherein the inner box includes an area that is to be left unfilled;
   determining whether the detected inner box is big enough for pre-clipping, comprising:
   a. comparing an inner box width to a first pre-defined threshold;
   b. comparing an inner box height to a second pre-defined threshold;
   upon determining that the inner box width is smaller than the first pre-defined threshold or that the inner box height is smaller than the second pre-defined threshold, making a determination that the inner box is too small for pre-clipping; and
   confirming that an outer clip path contains the detected inner box.

2. The method of claim 1, wherein an inner clip path is a rectangle, and wherein detecting the inner box comprises detecting that the inner box is the rectangle.

3. The method of claim 1, wherein an inner clip path consists of polygon lines, and wherein detecting the inner box comprises:
   calculating the center point for the polygon lines;
   comparing each polygon point with the calculated center point; and
   determining at least two corner coordinates of the inner box.

4. The method of claim 3, wherein calculating the center point for the polygon lines comprises:
   calculating an X-coordinate of the center point, as Xcenter=(X0+X1+ . . . +Xn−1)/n, where n is a point number of polygon lines; and calculating a Y-coordinate of the center point as Ycenter= (Y0+Y1+ . . . +Yn−1)/n.

5. The method of claim 3, wherein comparing each polygon point with the calculated center point for the polygon lines comprises making one of the following determinations:

(a) the polygon point is in left top of center point if:

Inner box X_lefttop=maximum(Xn)

Inner box Y_lefttop=maximum(Yn)

Where Xn and Yn are polygon X and Y coordinates located at left top of center point;

(b) the polygon point is in right top of center point if:

Inner box X_righttop=minimum(Xn)

Inner box Y_righttop=maximum(Yn)

Where Xn and Yn are polygon X and Y coordinates located at right top of center point;

(c) The polygon point is in left bottom of center point if:

Inner box X_leftbottom=maximum(Xn)

Inner box Y_leftbottom=minimum(Yn)

Where Xn and Yn are polygon X and Y coordinates located at left bottom of center point; and (d) The polygon point is in right bottom of center point if:

Inner box X_rightbottom=minimum(Xn)

Inner box Y_rightbottom=minimum(Yn)

Where Xn and Yn are polygon X and Y coordinates located at left bottom of center point.

6. The method of claim 5, wherein determining at least two corner coordinates of the inner box comprises:

a. calculating left top corner coordinate of the inner box as follows:

Inner box X_lefttop=maximum(inner box X_lefttop, inner box X_leftbottom)

Inner box Y_lefttop=maximum(inner box Y_lefttop, inner box Y_righttop); and b. calculating the right bottom corner coordinate of the inner box as follows:

Inner box X_rightbottom=minimum(inner box X_righttop,inner box X_rightbottom)

Inner box Y_rightbottom=minimum(inner box Y_leftbottom,inner box Y_rightbottom).

7. The method of claim 1, wherein an inner clip path consists of four Bezier cubic curves and four polygon lines, and wherein detecting the inner box comprises:

calculating a center point using all start points, end points, and control points, according to the following equations: Xcenter=(X0+X1+ . . . +Xn−1)/n and Ycenter= (Y0+Y1+ . . . +Yn−1)/n, where n is a point number of polygon lines;

determining which region relative to the calculated center point the four Bezier cubic curves are contained inside, wherein the region is one of (a) left top, (b) right top, (c) left bottom, or (d) right bottom, and wherein the determining includes checking the relationship between the center point and Bezier curve points;

calculating Bezier curve bounding boxes;

determining inner box candidate points; and calculating at least two corner coordinates of the inner box.

8. The method of claim 7, wherein determining which region relative to the calculated center point the four Bezier cubic curves are contained inside, comprises making determinations based on the following relations, wherein Ps(Xs, Ys) is a Bezier cursive start point, Pe(Xe,Ye) is a Bezier cursive end point, and Pc1(Xc1,Yc1) and Pc2(Xc2,Yc2) are two control points:

(a) the Bezier curve is located in left top of center point if the following conditions are true:

(Xs<Xcenter) AND (Ys<Ycenter) AND (Xe<Xcenter) AND (Ye<Ycenter) AND (Xc1<Xcenter) AND (Yc1<Ycenter) AND (Xc2<Xcenter) AND (Yc2<Ycenter);

(b) the Bezier curve is located in right top of center point if the following conditions are true:

(Xs>Xcenter) AND (Ys<Ycenter) AND (Xe>Xcenter) AND (Ye<Ycenter) AND (Xc1>Xcenter) AND (Yc1<Ycenter) AND (Xc2>Xcenter) AND (Yc2<Ycenter);

(c) the Bezier curve is located in left bottom of center point if the following conditions are true:

(Xs<Xcenter) AND (Ys>Ycenter) AND (Xe<Xcenter) AND (Ye>Ycenter) AND (Xc1<Xcenter) AND (Yc1>Ycenter) AND (Xc2<Xcenter) AND (Yc2>Ycenter); and (d) the Bezier curve is located in right bottom of center point if the following conditions are true:

(Xs>Xcenter) AND (Ys>Ycenter)

(Xe>Xcenter) AND (Ye>Ycenter)

(Xc1>Xcenter) AND (Yc1>Ycenter)

(Xc2>Xcenter) AND (Yc2>Ycenter).

9. The method of claim 7, wherein determining the inner box candidate points comprises making the following determinations:

if the Bezier curve is located in left top of center point the right, bottom point of its bounding box is the inner box candidate point;

if the Bezier curve is located in right top of center point, the left bottom point of its bounding box is the inner box candidate point;

if the Bezier curve is located in left bottom of center point, the right top point of its bounding box is the inner box candidate point; and if the Bezier curve is located in right bottom of center point, the left top point of its bounding box is the inner box candidate point.

10. The method of claim 7, wherein calculating at least two corner coordinates of the inner box includes calculating a left top point and a right bottom point, using the following relations:

Inner box X_lefttop=maximum(X coordinates of inner box candidate points and polygon line points, which points are inside left top region of center point);

Inner box Y_lefttop=maximum(Y coordinates of inner box candidate points and polygon line points, which points are inside left top region of center point);

Inner box X_righttop=minimum(X coordinates of inner box candidate points and polygon line points, which points are inside right top region of center point);

Inner box Y_righttop=maximum(Y coordinates of inner box candidate points and polygon line points, which points are inside right top region of center point);

Inner box X_leftbottom=maximum(X coordinates of inner box candidate points and polygon line points, which points are inside left bottom region of center point);

Inner box Y_leftbottom=minimum(Y coordinates of inner box candidate points and polygon line points, which points are inside left bottom region of center point);

Inner box X_rightbottom=minimum(X coordinates of inner box candidate points and polygon line points, which points are inside right bottom region of center point);

Inner box Y_rightbottom=minimum(Y coordinates of inner box candidate points and polygon line points, which points are inside right bottom region of center point);

Inner box X_lefttop=maximum(X_lefttop,X_leftbottom);

Inner box Y_lefttop=maximum(Y_lefttop,Y_righttop);

Inner box X_rightbottom=minimum(X_righttop, X_rightbottom); and

Inner box Y_rightbottom=minimum(Y_leftbottom, Y_rightbottom).

11. The method of claim 1, further comprising:
upon determining that the inner box width is smaller than the first pre-defined threshold or that the inner box height is smaller than the second pre-defined threshold, filling the entire drawing shape with tiles; and clipping tiles inside the inner box.

12. The method of claim 1, wherein an outer clip path is a rectangle, and wherein confirming that an outer clip path contains the detected inner box includes determining that the following conditions are satisfied:

(X_outer_lefttop<inner box X_lefttop);

(Y_outer_lefttop<inner box Y_lefttop);

(X_outer_rightbottom>inner box X_rightbottom); and (Y_outer_rightbottom>inner box Y_rightbottom), wherein the outer rectangle left top point is defined as (X_outer_lefttop,Y_outer_lefttop) and the outer rectangle right bottom point is defined as (X_outer_rightbottom, Y_outer_rightbottom).

13. The method of claim 1, wherein an outer clip path consists of polygon lines, and wherein confirming that an outer clip path contains the detected inner box includes determining that the following conditions are satisfied:

((Ys<inner box Y_lefttop) AND (Ye<inner box Y_lefttop)); OR ((Xs<inner box X_lefttop) AND (Xe<inner box X_lefttop)); OR ((Xs>inner box X_rightbottom) AND (Xe>inner box X_rightbottom)); OR ((Ys>inner box Y_rightbottom) AND (Ye>inner box Y_rightbottom)), wherein (Xs,Ys) is defined as the polygon line start point and (Xe,Ye) is the polygon line end point.

14. The method of claim 1, further comprising determining whether any tiles are inside the inner box.

15. The method of claim 14, wherein determining whether any tiles are inside the inner box comprises:
determining a tile bonding box of a particular tile in the tiling area;
comparing the determined tile bonding box with the inner box to determine if the tile is inside the inner box.

16. The method of claim 15, wherein the tile is determined to be inside the inner box if the following conditions are satisfied:

(X_tile_lefttop>inner box X_lefttop);

(Y_tile_lefttop>inner box Y_lefttop);

(X_tile_rightbottom<inner box X_innerbox_rightbottom); and (Y_tile_rightbottom<inner box Y_rightbottom), wherein a left top point of tile bounding box is defined as (X_tile_lefttop,Y_tile_lefttop) and a right bottom of tile bounding box is defined as (X_tile_rightbottom, Y_tile_rightbottom).

17. The method of claim 1, further comprising:
filling the tile; and
printing a page comprising the drawing shape.

18. A non-transitory computer-readable medium having instructions stored therein that are executable by a processor to cause a system to perform functions comprising:
detecting an inner box in a drawing shape to be filled, wherein the inner box includes an area that is to be left unfilled;
determining whether the detected inner box is big enough for pre-clipping, comprising:
a. comparing an inner box width to a first pre-defined threshold;
b. comparing an inner box height to a second pre-defined threshold;
upon determining that the inner box width is smaller than the first pre-defined threshold or that the inner box height is smaller than the second pre-defined threshold, making a determination that the inner box is too small for pre-clipping; and
confirming that an outer clip path contains the detected inner box.

19. A system comprising:
a processor; and
a non-transitory computer-readable medium having stored therein instructions that are executable to cause the system to perform functions comprising:
detecting an inner box in a drawing shape to be filled, wherein the inner box includes an area that is to be left unfilled;
determining whether the detected inner box is big enough for pre-clipping, comprising:
a. comparing an inner box width to a first pre-defined threshold;

b. comparing an inner box height to a second pre-defined threshold;

upon determining that the inner box width is smaller than the first pre-defined threshold or that the inner box height is smaller than the second pre-defined threshold, making a determination that the inner box is too small for pre-clipping; and confirming that an outer clip path contains the detected inner box.

* * * * *